(12) United States Patent
Marcigliano et al.

(10) Patent No.: US 8,423,252 B2
(45) Date of Patent: Apr. 16, 2013

(54) CONTROL METHOD OF SHIFTING GEAR IN AN AUTOMATIC MANUAL TRANSMISSION

(75) Inventors: Francesco Marcigliano, Maranello (IT); Luca Poggio, Casalecchio di Reno (IT); Davide Montosi, Fiorano Modenese (IT)

(73) Assignee: Ferrari S.p.A., Modena (IT)

( * ) Notice: Subject to any disclaimer, the term of this patent is extended or adjusted under 35 U.S.C. 154(b) by 236 days.

(21) Appl. No.: 12/659,365

(22) Filed: Mar. 5, 2010

(65) Prior Publication Data

US 2011/0098895 A1 Apr. 28, 2011

(30) Foreign Application Priority Data

Mar. 6, 2009 (IT) .............................. BO2009A0134

(51) Int. Cl.
*B60W 10/02* (2006.01)
(52) U.S. Cl.
USPC .............................................. 701/54; 701/51
(58) Field of Classification Search .................... 701/54, 701/60, 67, 51, 53; 477/39, 77, 79, 109, 477/115, 166, 169, 174, 175, 180, 5, 6, 110, 477/111, 78, 120, 904, 154, 155; 74/330, 74/331, 335, 473.24, 665 D, 665 R, 473.21; 123/406.24, 406.25; 475/125
See application file for complete search history.

(56) References Cited

U.S. PATENT DOCUMENTS

| | | | | |
|---|---|---|---|---|
| 6,524,223 B2* | 2/2003 | Graf et al. | ...................... | 477/109 |
| 7,736,271 B2* | 6/2010 | Minami | ........................ | 477/176 |
| 2002/0039950 A1 | 4/2002 | Graf et al. | | |
| 2008/0207393 A1* | 8/2008 | Minami | .......................... | 477/77 |
| 2009/0320635 A1* | 12/2009 | Terada et al. | .............. | 74/473.36 |

FOREIGN PATENT DOCUMENTS

| | | |
|---|---|---|
| DE | 10138998 | 3/2003 |
| EP | 1174303 | 1/2002 |

OTHER PUBLICATIONS

Italian Search Report mailed Nov. 20, 2009 in Italian Appln. No. B020090134.

* cited by examiner

*Primary Examiner* — Thomas Black
*Assistant Examiner* — Marthe Marc-Coleman
(74) *Attorney, Agent, or Firm* — Davidson Berquist Jackson & Gowdey, LLP

(57) ABSTRACT

A control method of shifting gear in an automatic manual transmission to pass from a current gear to a successive gear; the automatic gear transmission comprises a gearbox provided with at least one primary shaft and at least one secondary shaft connected to driving wheels, and at least one clutch interposed between the primary shaft of the gearbox and a drive shaft of an engine; the control method comprises the steps of: determining, when the clutch is at least partially closed, a target torque that has to be transmitted through the clutch; determining, when the clutch is at least partially closed, a rotation speed target of the drive shaft of the engine; and determining a target engine torque of the engine according to the target torque that has to be transmitted through the clutch and according to the rotation speed target of the drive shaft of the engine.

6 Claims, 4 Drawing Sheets

CONTROL METHOD OF SHIFTING GEAR IN AN AUTOMATIC MANUAL TRANSMISSION

TECHNICAL FIELD

The present invention relates to a control method for shifting gear in an automatic manual transmission.

PRIOR ART

Automatic manual transmissions (commonly named "AMT") are increasingly widespread, which are structurally similar to manual gearbox of the traditional type except for the clutch pedal and the gear selection lever operated by the driver being replaced by corresponding electric or hydraulic servo controls.

An automatic manual transmission is provided with a transmission control unit which, while shifting gear, drives the servo controls associated with clutch and gearbox to disengage the current gear and engage the successive gear; furthermore, while shifting gear, the transmission control unit interfaces with a control unit of the engine to appropriately adjust the torque delivered by the engine so as to adapt the engine operation according to the transmission ratio, and to avoid a temporary undesired increase/decrease of engine rpm when the clutch is open or in all cases either opening or closing. Such a control method is applied both to traditional single clutch gearboxes and to double clutch gearboxes; the only difference between the two types of gearboxes resides in that in a single clutch gearbox there is a central time interval in which the clutch is completely open (i.e. the engine rotates idling without load), while in a double clutch gearbox the two clutches mutually cross over and therefore a clutch opening/closing situation exists during the whole shifting operation.

In the known, currently marketed automatic manual transmissions, while shifting gear, the transmission control unit sends a torque target to be pursued to the engine control unit. In order to pursue the torque target, the engine control unit generally uses an open-loop control based on a model of the engine. However, the engine model is rather inaccurate because it is affected both by intrinsic model errors and errors caused by engine component feature dispersion (i.e. engine components rarely exactly have the nominal features and normally slightly differ in a random manner from the normal features); furthermore, there are many external factors which may affect, more or less randomly and unpredictably, the torque generation, such as for example coolant temperature, air conditioner compressor operation, and alternator operation to feed the vehicle electric loads.

Due to the inaccuracy of the engine model, torque control may be imprecise and therefore cause too much or too little torque as compared to the torque target required by the transmission control unit, which determines undesired oscillations (temporary increases or drops) of engine rpm; these engine rpm oscillations are particularly annoying because they are clearly perceived by the driver (and by possible passengers) both acoustically by hearing the noise generated by the engine, and physically because they may cause longitudinal vibrations of the vehicle and thus transmit the feeling that the automatic manual transmission is either not working properly or is inefficient, to the driver (and to possible passengers).

The above-described engine rpm oscillations while shifting gear are highly attenuated and therefore barely perceived in engines of medium-small displacement (and thus power), but are highly amplified and thus very evident in high-performance sports engines which have a large displacement (and thus power) combined with a very low mechanical inertia. Therefore, the need to limit the above-described engine rpm oscillations while shifting gear is strongly felt in high-performance sports engines while it is less important in small-medium displacement engines.

DE10138998A1 describes a shifting control device for an automatic manual transmission; the control device adjusts the gearbox output shaft torque, while the adjustment of the rotation speed of a gearbox inlet shaft overlays the torque adjustment of the output shaft.

US2002039950A1 describes a power unit comprising an engine controlled by an engine controller and a transmission controlled by a transmission controller. An intervention signal is transferred from the transmission controller to the engine controller by means of a specific data connection.

DESCRIPTION OF THE INVENTION

It is the object of the present invention to provide a control method of shifting gear in an automatic manual transmission, which control method is free from the above-described drawbacks while being easy and cost-effective to be implemented.

According to the present invention, a control method of shifting gear in an automatic manual transmission is described as claimed in the attached claims.

BRIEF DESCRIPTION OF THE DRAWINGS

The present invention will now be described with reference to the accompanying drawings, which illustrate a non-limitative embodiment thereof, in which.

PREFERRED EMBODIMENTS OF THE INVENTION

Figure 1:
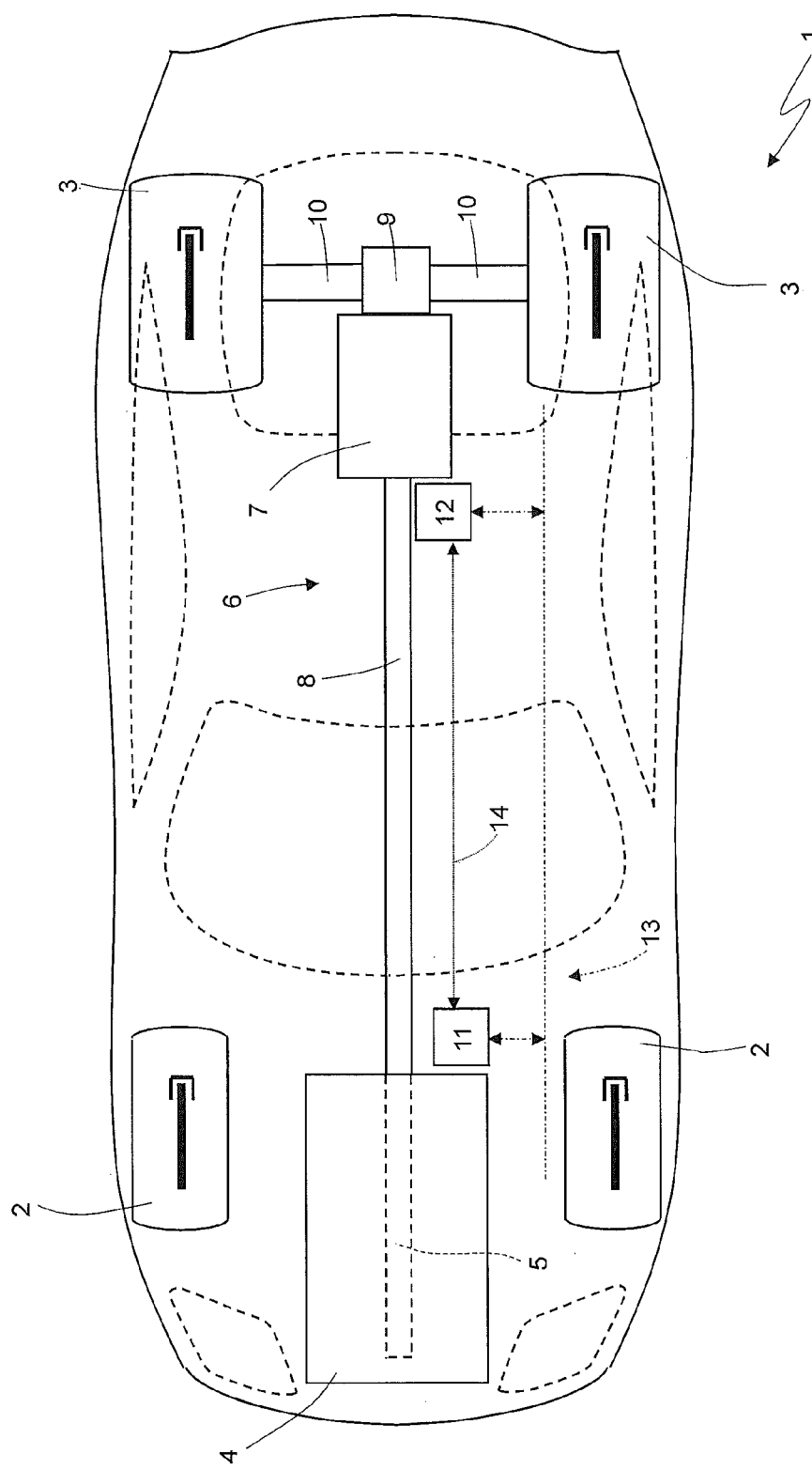
FIG. 1 is a diagrammatic plan view of a rear wheel drive vehicle provided with an automatic manual transmission which is controlled according to the control method of the present invention.

In FIG. 1, numeral 1 indicates as a whole a vehicle (in particular, a car) provided with two front wheels 2 and two rear driving wheels 3; an internal combustion engine 4 is arranged in front position, which is provided with a drive shaft 5 and produces a torque, which is transmitted to the rear driving wheels 3 by means of an automatic manual transmission 6. Transmission 6 comprises a double clutch gearbox 7 arranged on the rear axle and a propeller shaft 8 which connects the drive shaft 5 to an inlet of gearbox 7. A self-locking differential 9 is arranged in cascade to gearbox 7, from which differential a pair of axle shafts 10 depart, each of which is integral with a rear driving wheel 3.

Vehicle 1 comprises a control unit 11 of engine 4, which governs the engine 4, a control unit 12 of transmission 6, which governs the transmission 6, and a BUS line 13, which is made according to the CAN (Car Area Network) protocol, extends throughout the vehicle 1 and allows the control units 11 and 12 to dialog with each other. In other words, the control unit 11 of engine 4 and the control unit 12 of transmission 6 are connected to the bus line 13, and therefore may communicate with each other by means of messages forwarded on the BUS line 13 itself. Furthermore, the control unit 11 of engine 4 and the control unit 12 of transmission 6 may be directly connected to each other by means of a dedicated synchronization wire 14, which is capable of directly transmitting a signal without the delays introduced by the BUS line 13 from the control unit 12 of transmission 6 to the control unit 11 of engine 4.

Figure 2:
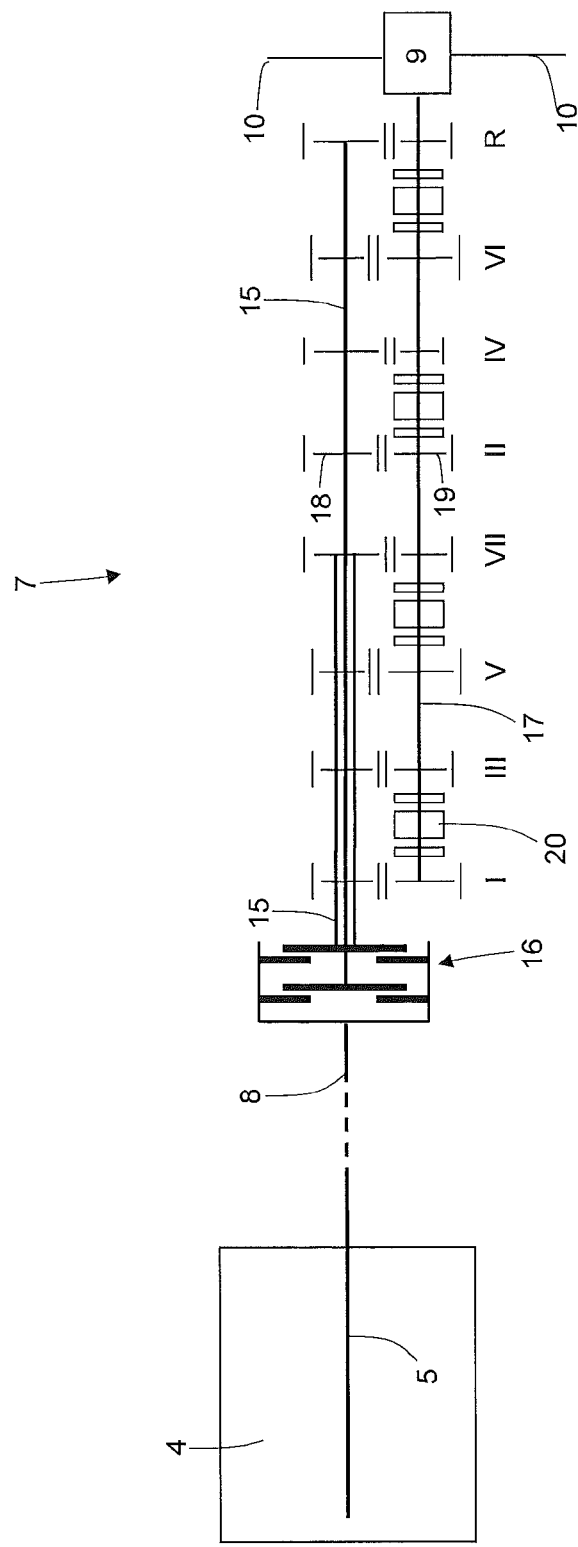
FIG. 2 is a diagrammatic view of the automatic manual transmission of FIG. 1 provided with a double clutch gearbox.

As shown in FIG. 2, the double clutch gearbox 7 comprises a pair of mutually coaxial, independent primary shafts 15, inserted one within the other. Furthermore, the double clutch gearbox 7 comprises two coaxial clutches 16 arranged in series, each of which is adapted to connect a respective primary shaft 15 to the drive shaft 5 of the internal combustion engine 4 by means of the interposition of the propeller shaft 8. The double clutch gearbox 7 comprises a single secondary shaft 17 connected to differential 9 which transmits motion to the rear driving wheels 3; according to an alternative, equivalent embodiment, the double clutch gearbox 7 comprises two secondary shafts 17 both connected to differential 9.

The double clutch gearbox 7 has seven forward speeds indicated by Roman numerals (first gear I, second gear II, third gear III, fourth gear IV, fifth gear V, sixth gear VI and seventh gear VII) and one reverse (indicated by the letter R). The primary shaft 15 and the secondary shaft 17 are mechanically coupled to each other by means of a plurality of gear pairs, each of which defines a respective speed and comprises a primary gear 18 mounted to the primary shaft 15 and a secondary gear 19 mounted to the secondary shaft 17. In order to allow the correct operation of the double clutch gearbox 4, all the odd speeds (first gear I, third gear III, fifth gear V, seventh gear VII) are coupled to a same primary shaft 5a, while all the even speeds (second gear II, fourth gear IV, and sixth gear VI) are coupled to the other primary shaft 15.

Each primary gear 18 is keyed onto a respective primary shaft 15 to rotate, again integrally, with the primary shaft 15 itself, and permanently meshes with the respective secondary gear 19; instead, each secondary gear 19 is idly mounted to the secondary shaft 17. Furthermore, the double clutch gearbox 7 comprises four double synchronizers 20, each of which is mounted to be coaxial to the secondary shaft 17, is arranged between two secondary gears 19, and is adapted to be actuated to alternatively engage the two respective secondary gears 19 onto the secondary shaft 17 (i.e. to alternatively make the two respective secondary gears 19 angularly integral with the secondary shaft 17). In other words, each synchronizer 20 may be displaced either in one direction to engage a secondary gear 19 onto the secondary shaft 17, or in the other direction to engage the other secondary gear 19 onto the secondary shaft 17.

The methods of shifting from a current gear A to a successive gear B is described below. A shift up during the gear sequence will be described for simplicity, and therefore the current gear A has a higher transmission ratio than the successive gear B.

In an initial situation (i.e. before shifting gear), a clutch 16A is closed to transmit motion to a primary shaft 15A, which in turn transmits motion to the secondary shaft 17 by means of the current engaged gear A; a clutch 16B is, instead, open and thus isolates a primary shaft 15B from the transmission shaft 8. Before starting to shift up, the successive gear B is engaged to connect the primary shaft 15B to the secondary shaft 17 by means of the gear B itself; once gear B has been engaged, the shifting starts by opening the clutch 16A to disconnect the primary shaft 15A (thus gear A) from the propeller shaft 8 (i.e. the drive shaft 5 of engine 4), while closing the clutch 16B to connect the primary shaft 15B (thus gear B) to the propeller shaft 8 (i.e. the drive shaft 5 of engine 4).

Figure 3:
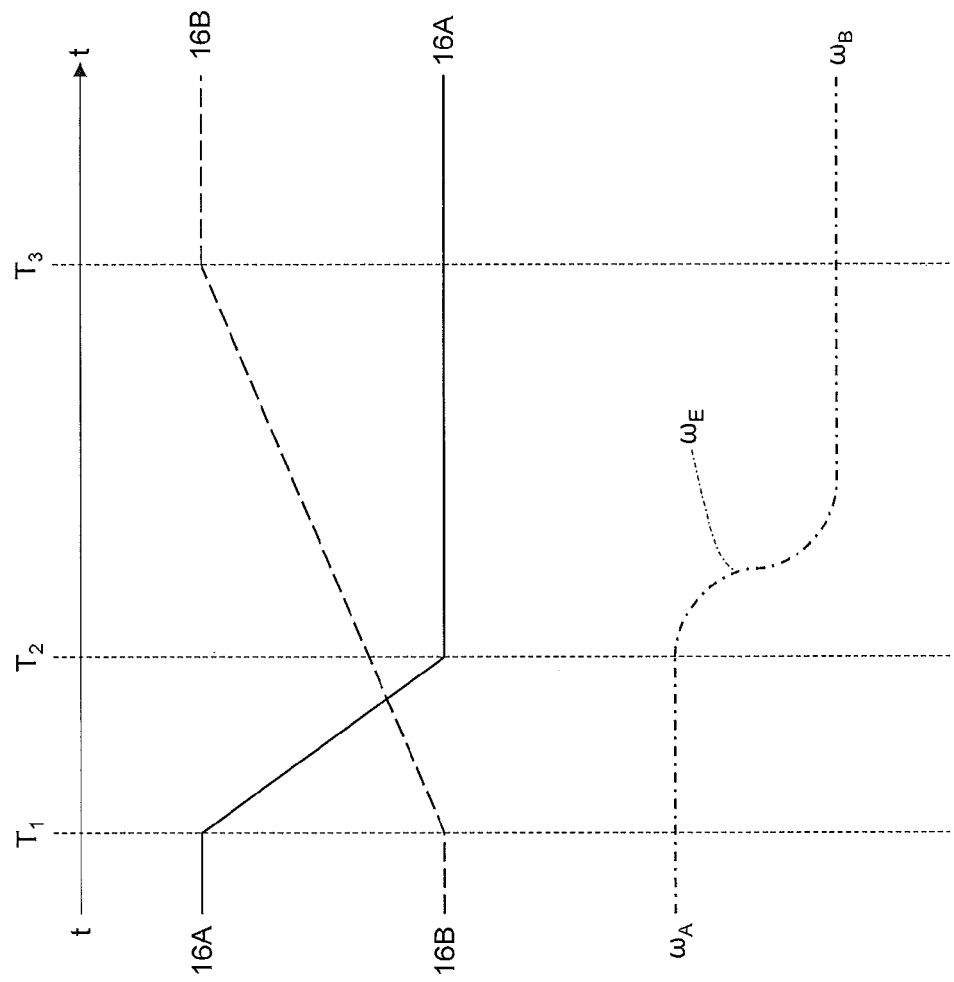
FIG. 3 shows the time evolution of the positions of the two clutches of the double clutch gearbox and of the rotation speed of a drive shaft of the engine while shifting gear.

The above-described shifting methods are diagrammatically shown in FIG. 3, which shows that before moment $T_1$, the clutch 16A is closed and the clutch 16B is opened, and that the clutch 16A starts opening while starting closing the clutch 16B at moment $T_1$. At moment $T_2$, clutch 16A is completely open while clutch 16B is in an intermediate configuration (opening a clutch 16 is generally faster than closing the same); at moment $T_3$, clutch 16B is completely closed and at moment $T_3$, the clutch 16A is then opened and the clutch 16B is closed. It is thus apparent that shifting starts at moment $T_1$ and ends at moment $T_3$. The rotation speed $\omega_E$ of the drive shaft 5 of engine 4 is equal to the rotation speed $\omega_A$, before shifting, gradually drops towards the rotation speed $\omega_B$ while shifting, and is equal to the rotation speed $\omega_B$ after shifting. As shown in FIG. 3, until moment $T_2$ when the clutch 16A is completely open, the rotation speed $\omega_E$ of the drive shaft 5 is kept constant and equal to rotation speed $\omega_A$, and is thus decreased only after the clutch 16A is completely open; such a method of controlling the rotation speed $\omega_E$ of the drive shaft 5 is aimed at avoiding the clutch 16A from becoming braking, i.e. from generating a braking torque on the rear driving wheels 3.

Figure 4:
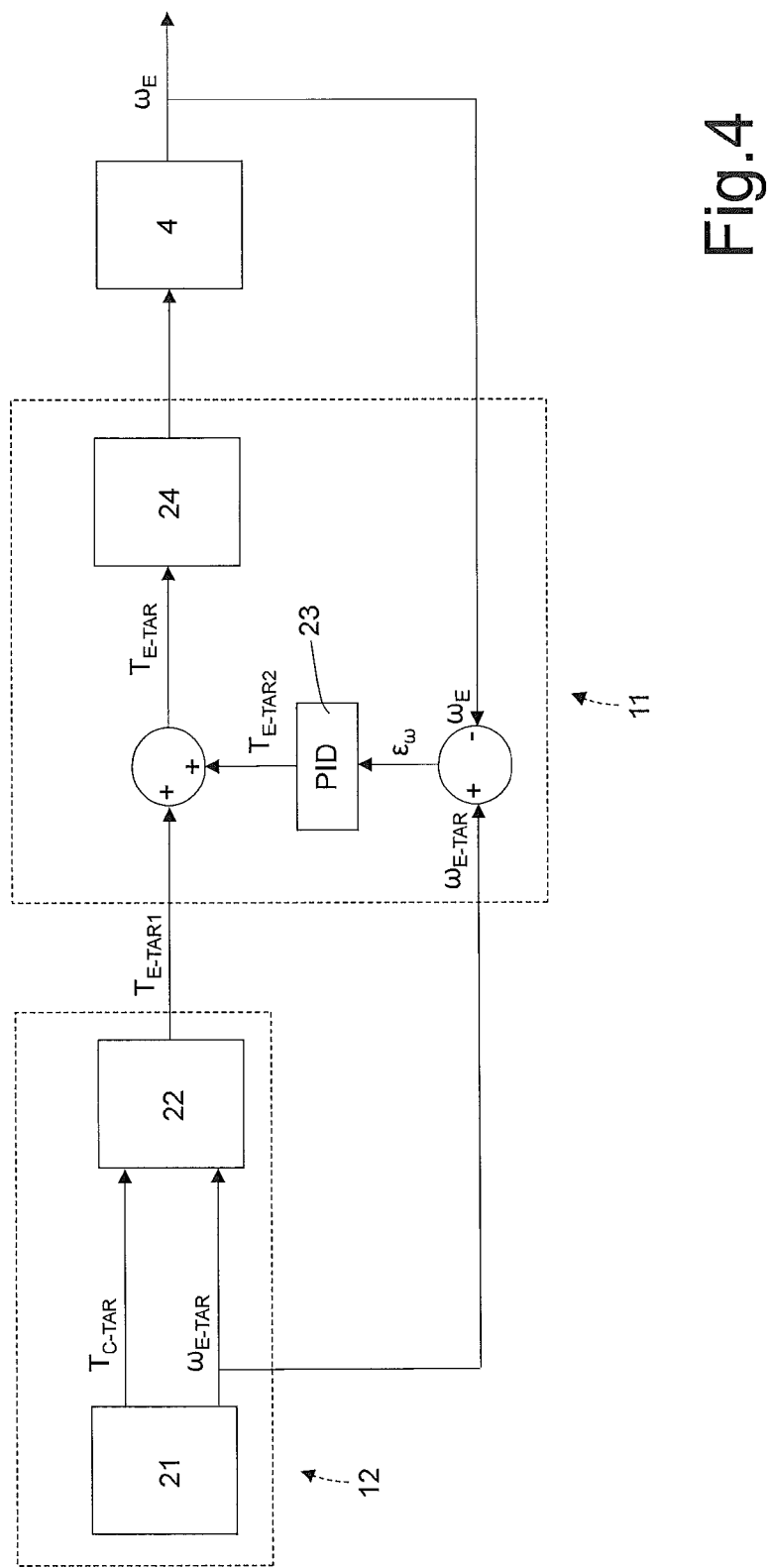
FIG. 4 is a block diagram of a driving logic of the manual automatic transmission in FIG. 1.

As shown in FIG. 4, during the whole gear shifting, i.t. from the start moment $T_1$ in which the clutch 16A is opened, corresponding to the current gear A, to the moment $T_3$ in which the clutch 16B is completely closed, corresponding to the successive gear B, the control unit 12 of transmission 6 determines a target torque $T_{E-TAR}$ of the engine 4; the control unit 12 of transmission 6 communicates the target torque $T_{E-TAR}$ of the engine 4 to the control unit 11 of engine 4 by means of the BUS line 13 and/or by means of the dedicated synchronization wire 14, so that the control unit 11 of engine 4 drives the engine 4 to pursue the torque target $T_{E-TAR}$ of the engine 4.

During a a step of designing the vehicle 1, a model of engine 4 and transmission 6 is determined, which allows to simulate the behavior of engine 4 and transmission 6; in particular, such a model uses the transmissibility functions of the clutches 16, each of which provides the torque which is transmitted from the corresponding clutch 16 according to the opening degree (i.e. the position if the position is controlled or the hydraulic pressure if the pressure is controlled) of the clutch 16 itself.

The control unit 12 of transmission 6 comprises a control block 21, which determines a torque target $T_{C-TAR}$ which is to be transmitted through the clutches 16, and a rotation speed target $\omega_{E-TAR}$ of the drive shaft 5 of engine 4 according to the desired gear shifting evolution; in other words, the desired gear shifting evolution is generally described by a speed target while shifting and by a longitudinal acceleration target while shifting, and a torque target $T_{C-TAR}$ which is to be transmitted through the clutches 16 and a rotation speed target $\omega_{E-TAR}$ of the drive shaft 5 of engine 4 may be determined on the basis of these speed and longitudinal acceleration targets. Furthermore, the control unit 12 of transmission 6 comprises a control block 22 which uses the model of engine 4 and transmission 6 to determine in open-loop a first contribution $T_{E-TAR1}$ of the target torque $T_{E-TAR}$ of the engine 4 according to the target torque $T_{C-TAR}$ which is to be transmitted through the clutch 16 and according to the rotation speed target $\omega_{E-TAR}$ of the drive shaft 5 of the engine 4. It is worth noting that the torque target $T_{C-TAR}$ which is to be transmitted through the clutches 16 is equal to the sum of the torque to be transmitted by the clutch 16A and the torque to be transmitted by the clutch 16B.

According to the torque target $T_{C\text{-}TAR}$ to be transmitted through each clutch 16, the opening degree (i.e. the position if the position is controlled or the hydraulic pressure if the pressure is controlled) of the clutch 16 itself may be determined by using the corresponding transmissibility function; in other words, once the required evolution of the torque target $T_{C\text{-}TAR}$ to be transmitted through each clutch 16 has been determined, the evolution of the opening degree (position or hydraulic pressure) is set by the physical features of the clutch 16 itself and is provided by the corresponding transmissibility function.

Moreover, the control unit 11 of engine 4 uses a feedback control for determining in closed-loop a second contribution $T_{E\text{-}TAR2}$ of the torque target $T_{E\text{-}TAR}$ of engine 4 according to the rotation speed target $\omega_{E\text{-}TAR}$ of the drive shaft 5 of engine 4 and using the rotation speed $\omega_E$ of the drive shaft 5 of engine 4 as a feedback variable. Therefore, the control unit 11 of engine algebraically adds (i.e. taking the sign into account) the first contribution $T_{E\text{-}TAR1}$ of the torque target $T_{E\text{-}TAR}$ of the engine 4 to the second contribution $T_{E\text{-}TAR2}$ of the torque target $T_{E\text{-}TAR}$ of the engine 4 to determine the torque target $T_{E\text{-}TAR}$ of the engine 4.

In particular, the control unit 11 of engine 4 receives the rotation speed target $\omega_{E\text{-}TAR}$ of the drive shaft 5 of engine 4 and the first contribution $T_{E\text{-}TAR1}$ of the torque target $T_{E\text{-}TAR}$ of the engine 4 from the control unit 12 of transmission 6 by means of the BUS line 13 and/or by means of the dedicated synchronization wire 14, determines a rotation speed error $\epsilon_E$ by comparing the rotation speed $\omega_E$ of the drive shaft 5 to the rotation speed target $\omega_{E\text{-}TAR}$ of the drive shaft 5 of engine 4, and determines the second contribution $T_{E\text{-}TAR2}$ of the torque target $T_{E\text{-}TAR}$ of the engine 4 according to the rotation speed error $\epsilon_E$ by means of a PID regulator 23. Finally, the control unit 11 of engine 4 comprises a controller which implements a model of the engine 4 and according to the torque target $T_{E\text{-}TAR}$ of engine 4 drives the engine 4 itself by means of an open-loop control.

It is worth noting that the first contribution $T_{E\text{-}TAR1}$ of the torque target $T_{E\text{-}TAR}$ of the engine 4 is determined in the control unit 12 of transmission 6, while the second contribution $T_{E\text{-}TAR2}$ of the torque target $T_{E\text{-}TAR}$ of the engine 4 is determined in the control unit 11 of engine 4, which is physically separated from the control unit 12 of transmission 6 and communicates with the control unit 12 of transmission 6 by means of the BUS line 13 and/or by means of the dedicated synchronization wire 14. Thereby, the effects of the transmission delays introduced by the communication between the two control units 11 and 12 may be minimized, because the first contribution $T_{E\text{-}TAR1}$ of the torque target $T_{E\text{-}TAR}$ of the engine 4 is determined by means of an open-loop control and thus has a lower variation speed, while the second contribution $T_{E\text{-}TAR2}$ of the torque target $T_{E\text{-}TAR}$ of the engine 4 is determined by means of a closed-loop control and thus has a higher variation speed.

As previously described, the rotation speed target $\omega_{E\text{-}TAR}$ of the drive shaft 5 of engine 4 provide for the rotation speed $\omega_E$ of the drive shaft 5 of engine 4 to remain constant and equal to the rotation speed $\omega_A$ before shifting gear until the moment $T_2$ when the clutch 16A corresponding to the current gear A is completely open.

According to a variant (not shown), the second contribution $T_{E\text{-}TAR2}$ of the torque target $T_{E\text{-}TAR}$ of the engine 4 is not used, and therefore the torque target $T_{E\text{-}TAR}$ of the engine 4 is equal to the first contribution $T_{E\text{-}TAR1}$ of the torque target $T_{E\text{-}TAR}$ of the engine 4 determined in open-loop by the control block 22.

According to alternative embodiment (not shown), the illustrated gearbox 7 is a single clutch gearbox and therefore comprises a single clutch 16 and a single primary shaft 15; in this case, the above-described control method is used when the clutch 16 is at least partially closed (i.e. during the initial step of opening the clutch 16 when the current gear A is still engaged and during the final step of closing the clutch when the successive gear B has been engaged). Instead, when clutch 16 is completely open while the current gear A is being disengaged and the successive gear B is being engaged, the torque transmitted by the clutch 16 is obviously zero and the methods of driving the engine 4 by the control unit 11 of engine 4 may be different and optimized for such a condition.

By virtue of also taking into account a rotation speed target $\omega_{E\text{-}TAR}$ of the drive shaft 5 of engine 4 in generating the torque target $T_{E\text{-}TAR}$ of the engine 4, and especially by virtue of that the second contribution $T_{E\text{-}TAR2}$ of the torque target $T_{E\text{-}TAR}$ of the engine 4 calculated in closed-loop using the rotation speed $\omega_E$ of the drive shaft 5 of engine 4 acts as a feedback variable, the evolution of the rotation speed $\omega_E$ of the drive shaft 5 of engine 4 may be controlled at every instant, thus avoiding undesired oscillations. In other words, if the first contribution $T_{E\text{-}TAR1}$ of the torque target $T_{E\text{-}TAR}$ of the engine 4 and/or the control of the engine 4 operated by the control unit 11 of engine 4 display errors due to the inaccuracy of the model of engine 4 and transmission and due to the dispersion of the features of the components, the rotation speed $\omega_E$ of the drive shaft 5 of engine 4 does not "run away" (i.e. neither undesirably increases nor decreases) by virtue of the compensating effect of the second contribution $T_{E\text{-}TAR2}$ of the torque target $T_{E\text{-}TAR}$ of the engine 4 calculated in closed-loop using the rotation speed $\omega_E$ of the drive shaft 5 of engine 4 as a feedback variable.

In brief, the above-described control method of shifting gear has several advantages. Firstly, the above-described control method of shifting gear allows to effectively avoid rpm oscillations of the engine 4 while shifting gear. Secondly, the above-described control method of shifting gear is simple and cost-effective to be implemented, because it does not require the installation of additional physical components (the rotation speed $\omega_E$ of the drive shaft 5 of engine 4 is an available measure on all currently marketed vehicles), and does not imply the need to increase the power of the control unit 12 of transmission 6 because a high additional calculation power is not required.

The invention claimed is:

1. Control method of shifting gear in an automatic manual transmission to pass from a current gear (A) to a successive gear (B); the automatic gear transmission comprises a gearbox, which is provided with at least one primary shaft and at least one secondary shaft connected to driving wheels, and at least one clutch, which is interposed between the primary shaft of the gearbox and a drive shaft of an engine; the control method comprises the steps of determining, when the clutch is at least partially closed, a target torque ($T_{C\text{-}TAR}$) that has to be transmitted through the clutch;

determining, when the clutch is at least partially closed, a rotation speed target ($\omega_{E\text{-}TAR}$) of the drive shaft of the engine;

determining a target engine torque ($T_{E\text{-}TAR}$) of the engine according to the target torque ($T_{C\text{-}TAR}$) that has to be transmitted through the clutch and according to the rotation speed target ($\omega_{E\text{-}TAR}$) of the drive shaft of the engine; and making the engine pursue the target engine torque ($T_{E\text{-}TAR}$) of the engine;

determining, during a design phase, a model of the engine and of the transmission;

using the model of the engine and of the transmission to determine in open-loop a first contribution ($T_{E\text{-}TAR1}$) of the target engine torque ($T_{E\text{-}TAR}$) of the engine according to the target torque ($T_{C\text{-}TAR}$) that has to be transmitted through the clutch and according to the rotation speed target ($\omega_{E\text{-}TAR}$) of the drive shaft of the engine;

using a feedback control to determine in closed-loop a second contribution ($T_{E\text{-}TAR2}$) of the target engine torque ($T_{E\text{-}TAR}$) of the engine according to the rotation speed target ($\omega_{E\text{-}TAR}$) of the drive shaft of the engine and using the rotation speed target ($\omega_{E\text{-}TAR}$) of the drive shaft of the engine as a feedback variable; and adding algebraically the first contribution ($T_{E\text{-}TAR1}$) of the target engine torque ($T_{E\text{-}TAR}$) of the engine to the second contribution ($T_{E\text{-}TAR2}$) of the target engine torque ($T_{E\text{-}TAR}$) of the engine in order to determine the target engine torque ($T_{E\text{-}TAR}$) of the engine.

2. The control method according to claim 1, wherein the gearbox is a double clutch gearbox and comprises two primary shafts and two clutches, each of which is interposed between the drive shaft of the engine and a corresponding primary shaft.

3. The control method according to claim 2 and comprising the further steps of:

opening one of the two clutches corresponding to the current gear (A);

closing the other one of the said two clutches corresponding to the successive gear (B);

making the engine pursue the target engine torque ($T_{E\text{-}TAR}$) of the engine (4) from the moment ($T_1$) in which said one of the two clutches corresponding to the current gear (A) starts opening until the moment ($T_3$) in which said other one of the said two clutches corresponding to the successive gear (B) is completely closed.

4. The control method according to claim 3, wherein in order to reach the rotation speed target ($\omega_{E\text{-}TAR}$) of the drive shaft of the engine the rotation speed ($\omega_E$) of the drive shaft of the engine has to be constant and equal to the rotation speed ($\omega_A$) before the gear shifting until a moment ($T_2$) in which said one of the two clutches corresponding to the current gear (A) is completely open.

5. Control method of shifting gear in an automatic manual transmission to pass from a current gear (A) to a successive gear (B); the automatic gear transmission comprises a gearbox, which is provided with at least one primary shaft and at least one secondary shaft connected to driving wheels, and at least one clutch, which is interposed between the primary shaft of the gearbox and a drive shaft of an engine; the control method comprises the steps of determining, when the clutch is at least partially closed, a target torque ($T_{C\ TAR}$) that has to be transmitted through the clutch;

determining, when the clutch is at least partially closed, a rotation speed target ($\omega_{E\text{-}TAR}$) of the drive shaft of the engine;

determining a target engine torque ($T_{E\text{-}TAR}$) of the engine according to the target torque ($T_{C\text{-}TAR}$) that has to be transmitted through the clutch and according to the rotation speed target ($\omega_{E\text{-}TAR}$) of the drive shaft of the engine; and making the engine pursue the target engine torque ($T_{E\text{-}TAR}$) of the engine;

determining, during a design phase, a model of the engine and of the transmission;

using the model of the engine and of the transmission to determine in open-loop a first contribution ($T_{E\text{-}TAR1}$) of the target engine torque ($T_{E\text{-}TAR}$) of the engine according to the target torque ($T_{C\text{-}TAR}$) that has to be transmitted through the clutch and according to the rotation speed target ($\omega_{E\text{-}TAR}$) of the drive shaft of the engine;

using a feedback control to determine in closed-loop a second contribution ($T_{E\text{-}TAR2}$) of the target engine torque ($T_{E\text{-}TAR}$) of the engine according to the rotation speed target ($\omega_{E\text{-}TAR}$) of the drive shaft of the engine and using the rotation speed target ($\omega_{E\text{-}TAR}$) of the drive shaft of the engine as a feedback variable;

adding algebraically the first contribution ($T_{E\text{-}TAR1}$) of the target engine torque ($T_{E\text{-}TAR}$) of the engine to the second contribution ($T_{E\text{-}TAR2}$) of the target engine torque ($T_{E\text{-}TAR}$) of the engine in order to determine the target engine torque ($T_{E\text{-}TAR}$) of the engine;

measuring the rotation speed ($\omega_E$) of the drive shaft;

determining a rotation speed error ($\epsilon_E$) by comparing rotation speed ($\omega_E$) of the drive shaft with the rotation speed target ($\omega_{E\text{-}TAR}$) of the drive shaft of the engine; and determining the second contribution ($T_{E\text{-}TAR2}$) of the target engine torque ($T_{E\text{-}TAR}$) of the engine according to the rotation speed error ($\epsilon_E$).

6. Control method of shifting gear in an automatic manual transmission to pass from a current gear (A) to a successive gear (B); the automatic gear transmission comprises a gearbox, which is provided with at least one primary shaft and at least one secondary shaft connected to driving wheels, and at least one clutch, which is interposed between the primary shaft of the gearbox and a drive shaft of an engine; the control method comprises the steps of determining, when the clutch is at least partially closed, a target torque ($T_{C\text{-}TAR}$) that has to be transmitted through the clutch;

determining, when the clutch is at least partially closed, a rotation speed target ($\omega_{E\text{-}TAR}$) of the drive shaft of the engine;

determining a target engine torque ($T_{E\text{-}TAR}$) of the engine according to the target torque ($T_{C\text{-}TAR}$) that has to be transmitted through the clutch and according to the rotation speed target ($\omega_{E\text{-}TAR}$) of the drive shaft of the engine; and making the engine pursue the target engine torque ($T_{E\text{-}TAR}$) of the engine;

determining, during a design phase, a model of the engine and of the transmission;

using the model of the engine and of the transmission to determine in open-loop a first contribution ($T_{E\text{-}TAR1}$) of the target engine torque ($T_{E\text{-}TAR}$) of the engine according to the target torque ($T_{C\text{-}TAR}$) that has to be transmitted through the clutch and according to the rotation speed target ($\omega_{E\text{-}TAR}$) of the drive shaft of the engine;

using a feedback control to determine in closed-loop a second contribution ($T_{E\text{-}TAR2}$) of the target engine torque ($T_{E\text{-}TAR}$) of the engine according to the rotation speed target ($\omega_{E\text{-}TAR}$) of the drive shaft of the engine and using the rotation speed target ($\omega_{E\text{-}TAR}$) of the drive shaft of the engine as a feedback variable;

adding algebraically the first contribution ($T_{E\text{-}TART}$) of the target engine torque ($T_{E\text{-}TAR}$) of the engine to the second contribution ($T_{E\text{-}TAR2}$) of the target engine torque ($T_{E-TAR}$) of the engine in order to determine the target engine torque ($T_{E-TAR}$) of the engine;

determining the first contribution ($T_{E-TAR1}$) of the target engine torque ($T_{E-TAR}$) of the engine in a control unit of the transmission; and determining the second contribution ($T_{E-TAR2}$) of the target engine torque ($T_{E-TAR}$) of the engine in a control unit of the engine, which is physically separated from the control unit of the transmission.

* * * * *